(12) United States Patent
Park et al.

(10) Patent No.: US 9,678,409 B2
(45) Date of Patent: Jun. 13, 2017

(54) CAMERA MODULE AND METHOD FOR AUTO FOCUSING THE SAME

(71) Applicant: LG INNOTEK CO., LTD., Seoul (KR)

(72) Inventors: Sang Ok Park, Seoul (KR); Hyun Rae Cho, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/391,303

(22) Filed: Dec. 27, 2016

(65) Prior Publication Data

US 2017/0108758 A1    Apr. 20, 2017

Related U.S. Application Data

(63) Continuation of application No. 14/399,379, filed as application No. PCT/KR2013/003600 on Apr. 26, 2013, now Pat. No. 9,568,805.

(30) Foreign Application Priority Data

May 17, 2012 (KR) .................. 10-2012-0052338
May 17, 2012 (KR) .................. 10-2012-0052339

(51) Int. Cl.
*G03B 13/36*  (2006.01)
*H04N 5/232*  (2006.01)
(Continued)

(52) U.S. Cl.
CPC .............. *G03B 13/36* (2013.01); *G03B 3/10* (2013.01); *H04N 5/2257* (2013.01); *H04N 5/23212* (2013.01)

(58) Field of Classification Search
CPC ............. H04N 5/23212; H04N 5/2254; H04N 5/2257; H04N 5/232; H04N 5/23209;
(Continued)

(56) References Cited

U.S. PATENT DOCUMENTS 4,477,167 A    10/1984  Ishikawa et al.
6,643,451 B1   11/2003  Tokura et al.
(Continued)

FOREIGN PATENT DOCUMENTS

JP    2006189506 A    7/2006
JP    2010262223 A    11/2010
(Continued)

OTHER PUBLICATIONS

International Search Report in International Application No. PCT/KR2013/003600, filed Apr. 26, 2013.
(Continued)

*Primary Examiner* — Michael Osinski
(74) *Attorney, Agent, or Firm* — Saliwanchik, Lloyd & Eisenschenk

(57) ABSTRACT

An exemplary embodiment of the present disclosure includes an actuator moving a mover including at least one lens receiving an optical image of an object; and an actuator driving unit controlling the actuator to drive the mover to a forward direction or to a reverse direction, wherein a separate direction bit is to drive a first search section and a second search section, in a case a search section driving the mover to the forward direction is defined as the first search section, and a search section driving the mover to the reverse direction is defined as the second search section.

20 Claims, 9 Drawing Sheets

(51) Int. Cl.
*H04N 5/225* (2006.01)
*G03B 3/10* (2006.01)

(58) Field of Classification Search
CPC .... H04N 5/23245; H04N 5/2253; G02B 7/09; G02B 7/021; G02B 7/023; H02K 41/0356; G03B 3/10; G03B 13/34; G03B 13/36; H02P 25/034; H02P 25/032
See application file for complete search history.

(56) References Cited

U.S. PATENT DOCUMENTS

| | | | |
|---|---|---|---|
| 8,174,608 B2 * | 5/2012 | Hara | G02B 7/08 310/307 |
| 8,189,093 B2 * | 5/2012 | Tanimura | G03B 3/10 310/307 |
| 8,368,256 B2 | 2/2013 | Yoo et al. | |
| 8,878,400 B2 | 11/2014 | Jung | |
| 9,036,076 B2 | 5/2015 | Imafuji et al. | |
| 9,167,143 B2 | 10/2015 | Ollila et al. | |
| 9,448,383 B2 | 9/2016 | Park | |
| 2005/0275294 A1 | 12/2005 | Izumi et al. | |
| 2007/0177860 A1 * | 8/2007 | Hooley | G02B 7/08 396/79 |
| 2007/0285557 A1 | 12/2007 | Wu | |
| 2008/0068487 A1 | 3/2008 | Morita | |
| 2008/0278030 A1 * | 11/2008 | Hara | G02B 7/08 310/307 |
| 2008/0278590 A1 * | 11/2008 | Tanimura | G03B 3/10 348/208.99 |
| 2008/0317456 A1 | 12/2008 | Lee et al. | |
| 2009/0102403 A1 | 4/2009 | Lule | |
| 2009/0278978 A1 | 11/2009 | Suzuki | |
| 2011/0050982 A1 | 3/2011 | Katsuyama et al. | |
| 2011/0058093 A1 | 3/2011 | Kim | |
| 2011/0128396 A1 | 6/2011 | Yano et al. | |
| 2011/0204731 A1 | 8/2011 | Yoo et al. | |
| 2011/0236008 A1 | 9/2011 | Kang et al. | |
| 2011/0261251 A1 | 10/2011 | Okamoto et al. | |
| 2012/0177354 A1 | 7/2012 | Ashizawa et al. | |
| 2012/0327293 A1 | 12/2012 | Ollila et al. | |
| 2013/0076967 A1 | 3/2013 | Brunner et al. | |
| 2013/0215526 A1 | 8/2013 | Park | |

FOREIGN PATENT DOCUMENTS

| | | |
|---|---|---|
| KR | 1020080112954 A | 12/2008 |
| KR | 1020100033689 A | 3/2010 |
| KR | 101126295 B1 | 3/2012 |
| WO | WO-2012060521 A1 | 5/2012 |

OTHER PUBLICATIONS

Office Action dated Nov. 17, 2016 in Chinese Application No. 201380025716.0.
Office Action dated Apr. 27, 2016 in U.S. Appl. No. 14/399,379.
Notice of Allowance dated Sep. 28, 2016 in U.S. Appl. No. 14/399,379.

* cited by examiner

CAMERA MODULE AND METHOD FOR AUTO FOCUSING THE SAME

CROSS-REFERENCE TO RELATED APPLICATIONS

This application is the continuation of U.S. application Ser. No. 14/399,379, filed Nov. 6, 2014, which is the U.S. national stage application of International Patent Application No. PCT/KR2013/003600, filed Apr. 26, 2013, which claims priority to Korean Application Nos. 10-2012-0052339 and 10-2012-0052338, filed May 17, 2012, the disclosures of each of which are incorporated herein by reference in their entirety.

TECHNICAL FIELD

The teachings in accordance with exemplary and non-limiting embodiments of this disclosure relate generally to a camera module and a method for auto focusing the camera module.

BACKGROUND ART

Recently, mobile phones and tablet PCs embedded with super small-sized compact camera modules are being developed. A conventional digital camera module mounted on the mobile phones has suffered from disadvantages in that a gap between an image sensor converting an outside light to a digital image or a digital video and a lens cannot be adjusted. However, a lens driving device such as a VCM (Voice Coil Motor) configured to adjust a gap between an image sensor and a lens has been recently developed to enable a camera module to obtain a further improved digital image and a digital video.

In general, a VCM mounted on a camera module is configured such that a mover mounted with a lens therein moves upward from a base to adjust a gap between the lens and an image sensor arranged at a rear surface of the base. The conventional VCM is configured such that an elastic member presses the mover to contact the base in a case no driving signal is applied. That is, the conventional VCM is configured such that, under a state where the elastic member presses the mover, an electromagnetic force for driving the mover must be greater than elasticity of the elastic member and self-weight of the mover in order to allow the mover to be distanced from the base.

Furthermore, the mover of the conventional VCM has a displacement of approximately 30 μm to 50 μm depending on posture of the VCM. Thus, the mover in the conventional VCM suffers from disadvantages in that it has a displacement depending on the posture of the VCM, includes a non-moving section where the mover is not driven even if a driving signal is applied, and the mover is driven by an auto focus algorithm not reflected therewith to thereby take too much time for auto focusing.

BRIEF SUMMARY

Technical Problem

Accordingly, it is an object of the present disclosure to provide a camera module configured to reduce a consumed current of the camera module, to increase resolution of camera module and to simplify an algorithm driving an actuator, and a method for auto focusing the camera module.

Technical Solution

In order to accomplish the above object, in one general aspect of the present disclosure; there is provided a camera module, the camera module comprising:

an actuator moving a mover including at least one lens receiving an optical image of an object; and an actuator driving unit controlling the actuator to drive the mover to a forward direction or to a reverse direction, wherein a separate direction bit is to drive a first search section and a second search section, in a case a search section driving the mover to the forward direction is defined as the first search section, and a search section driving the mover to the reverse direction is defined as the second search section.

Preferably, but not necessarily, a bit allocated to drive the first search section may be −LSB (Least Significant Bit)~0, and a bit allocated to drive the second search section may be 0~LSB.

Preferably; but not necessarily, a bit allocated to drive the first search section may be 0~MSB (Most Significant Bit), and a bit allocated to drive the second search section may be −LSB~0.

Preferably, but not necessarily, the first search section and the second search section may be symmetrical or asymmetrical.

Preferably, but not necessarily, the camera module may further comprise: a posture detection unit outputting a posture data by detecting a posture of the mover, and a controller receiving the posture data outputted by the posture detection unit and outputting a control signal to the actuator driving unit.

Preferably, but not necessarily, the posture of the mover may be one of an 'UP' posture of the lens, a 'SIDE' posture of the lens and a 'DOWN' posture of the lens.

Preferably, but not necessarily, the actuator may include a mover including the lens and formed with a first driving unit, a stator formed with a second driving unit for driving the mover using an electromagnetic interaction with the first driving unit, a bottom stopper fixed at the stator to stop the mover, and an upper stopper stopping the mover.

Preferably, but not necessarily, the actuator may further include an elastic member fixed at one side to the mover, and fixed at the other side opposite to the one side to the stator, to elastically support the mover.

In another general aspect of the present disclosure, there is provided a camera module, the camera module comprising: an actuator moving a mover including at least one lens receiving an optical image of an object; and an actuator driving unit controlling the actuator to drive the mover to a forward direction or to a reverse direction, wherein a driving scope of the mover includes a first search section and a second search section, in a case a search section driving the mover to the forward direction is defined as the first search section, and a search section driving the mover to the reverse direction is defined as the second search section.

Preferably, but not necessarily, one half may be allocated to drive the first search section and the other half may be allocated to drive the second search section.

Preferably, but not necessarily, the first search section and the second search section may be symmetrical.

Preferably, but not necessarily, the first search section and the second search section may be asymmetrical.

Preferably, but not necessarily, an LSB (Least Significant Bit) allocated between the first and second search sections may be within a 300~500 LSB scope.

Preferably, but not necessarily, an LSB (Least Significant Bit) allocated between the first and second search sections may be within a 500~1000 LSB scope.

In still another general aspect of the present disclosure, there is provided a method for auto focusing a camera module, the method comprising: moving a mover including a lens to an infinity or to a macro; searching a best focusing point by starting movement of the mover in the infinity or in the macro; and performing a focusing using the searched best focusing point.

Preferably, but not necessarily, the focusing may be performed to a forward direction using a separate direction bit.

In still another general aspect of the present disclosure, there is provided a method for auto focusing a camera module, the method comprising: performing a first search by moving a mover including a lens; determining whether an increase of focusing value is an infinity direction or a macro direction using the first search; moving the mover to the infinity to search a best focusing point, if it is determined that the focusing value increases to the infinity direction; and performing the focusing to the searched best focusing point.

Preferably; but not necessarily, the method may further include searching the best focusing point by moving the mover to the macro, in a case the focusing value increases to the macro direction in the step of determining whether an increase of focusing value is the infinity direction or the macro direction using the first search.

Preferably; but not necessarily, the method may further include reducing a mechanical impact sound by lengthening a time of moving the mover to the infinity direction or the macro direction in an initial step over that of other steps.

Preferably, but not necessarily, the method may further include reducing a mechanical impact sound by dividing a step size of initially moving the mover to the infinity direction or the macro direction to several stages.

Advantageous Effects

In an advantageous effect, an algorithm driving an actuator can be simplified by designating a current value for each address and by allocating a search section in which a mover can be driven to a forward direction and a reverse direction in a −1023~1023 bit scope using a forward direction bit and a reverse direction bit.

In another advantageous effect, resolution can be increased by driving the mover to both directions.

In still further advantageous effect, a consumed current can be reduced and a camera module can be optimally driven by detecting a posture of a VCM or a lens and by controlling the VCM using the posture data.

In still further advantageous effect, a defocusing problem can be solved by applying a current to a reverse direction even if there is a change in a spring due to a mover being drivable to both directions.

In still further advantageous effect, an algorithm driving an actuator can be simplified by designating a current value for each address and by allocating a search section in which a mover can be driven to a forward direction and a reverse direction using a forward direction bit and a reverse direction bit.

DETAILED DESCRIPTION

The disclosed exemplary embodiments and advantages thereof are best understood by referring to the accompanying drawings. Like numbers refer to like elements throughout. In the figures, certain layers, sizes, shapes, components or features may be exaggerated for clarity and convenience.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 1:
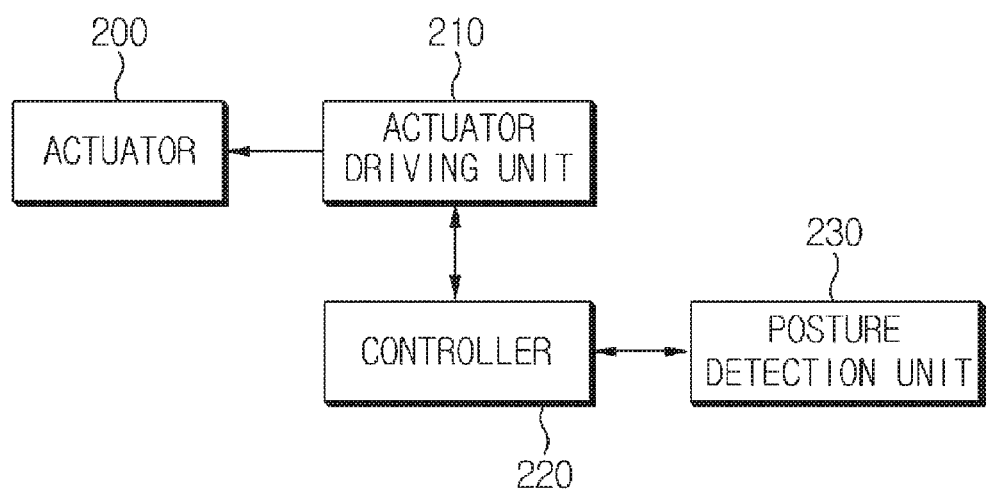
FIG. 1 is a schematic block diagram illustrating a configuration of a camera module according to an exemplary embodiment of the present disclosure.

FIG. 1 is a schematic block diagram illustrating a configuration of a camera module according to an exemplary embodiment of the present disclosure.

The camera module according to an exemplary embodiment of the present disclosure is configured such that a mover including at least one lens is driven to both directions (forward direction or reverse direction), and an LSB (Least Significant Bit) allocated to drive to both directions may be −1023~1023.

That is, the camera module includes an actuator (200) moving a mover including at least one lens receiving an optical image of an object, and an actuator driving unit (210) controlling the actuator (200) to drive the mover to both directions. The actuator driving unit (210) controls the actuator (200) to drive the mover to a forward direction or to a reverse direction.

Furthermore, in a case a search section driving the mover to a reverse direction is defined as a first search section, and a search section driving the mover to the forward direction is defined as the second search section, a bit allocated to drive the first search section may be −LSB~0, a bit allocated to drive the second search section may be 0~MSB (Most Significant Bit), a bit allocated to drive the first search section may be 0~MSB, or a bit allocated to drive the second search section may be −LSB~0.

By way of example, an LSB allocated to drive to the first and second search sections may be −1023~1023. At this time, the LSB to drive the first search section may be −1023~0, or an LSB to drive the second search section may be 0~1023. Furthermore, the first search section and the second search section may be symmetrical or asymmetrical.

Thus, the camera module according to an exemplary embodiment of the present disclosure can increase a resolving power of the camera module, because a direction bit can be added to a forward direction and a reverse direction to drive a mover to the forward direction and the reverse direction at −1023~1023 LSB, and a one-fold resolution can be possessed with a same number of bits over a case where no direction bit is available.

Meanwhile, the camera module according to an exemplary embodiment of the present disclosure may further include a posture detection unit (230) outputting a posture data by detecting a posture of the mover, and a controller (220) receiving the posture data outputted by the posture detection unit (230) and outputting a control signal to the actuator driving unit (210).

That is, the posture detection unit (230) detects a posture of the mover and outputs a posture data, while the controller (220) receives the posture data from the posture detection unit (230) and outputs a control signal corresponding to the posture of the mover to the actuator driving unit (210), and the actuator driving unit (210) appropriately drives the actuator (200) in response to the posture of the mover.

At this time, the posture of the mover may be one of an 'UP' posture of the lens, a 'SIDE' posture of the lens and a 'DOWN' posture of the lens, as will be described later. Although the posture detection unit (230) may sense more than the three kinds of postures, description will be made on sensing of the three postures of UP, SIDE and DOWN postures for convenience sake in the exemplary embodiment of the present disclosure.

The actuator (200) may be one of a VCM (Voice Coil Motor) actuator, an actuator driven by piezoelectric power, and a MEMS (Micro Electro Mechanical System) actuator driven by electrostatic capacity method. By way of example, the VCM performs an auto focusing of the camera module by driving the mover in response to an electromagnetic force. Furthermore, the posture detection unit (230) may include a gyro sensor configured to detect a gravitational direction.

Figure 2:
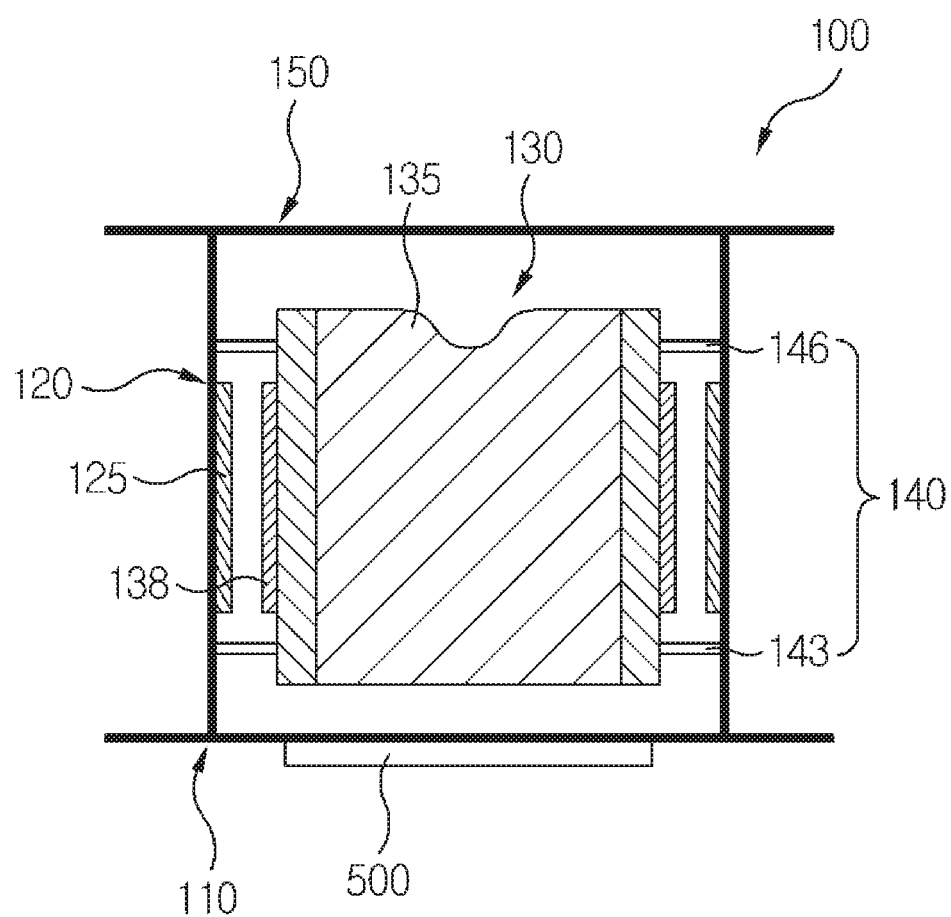
FIG. 2 is a schematic cross-sectional view illustrating a lens of a camera module being positioned at an upper surface direction according to an exemplary embodiment of the present disclosure.
Figure 3:
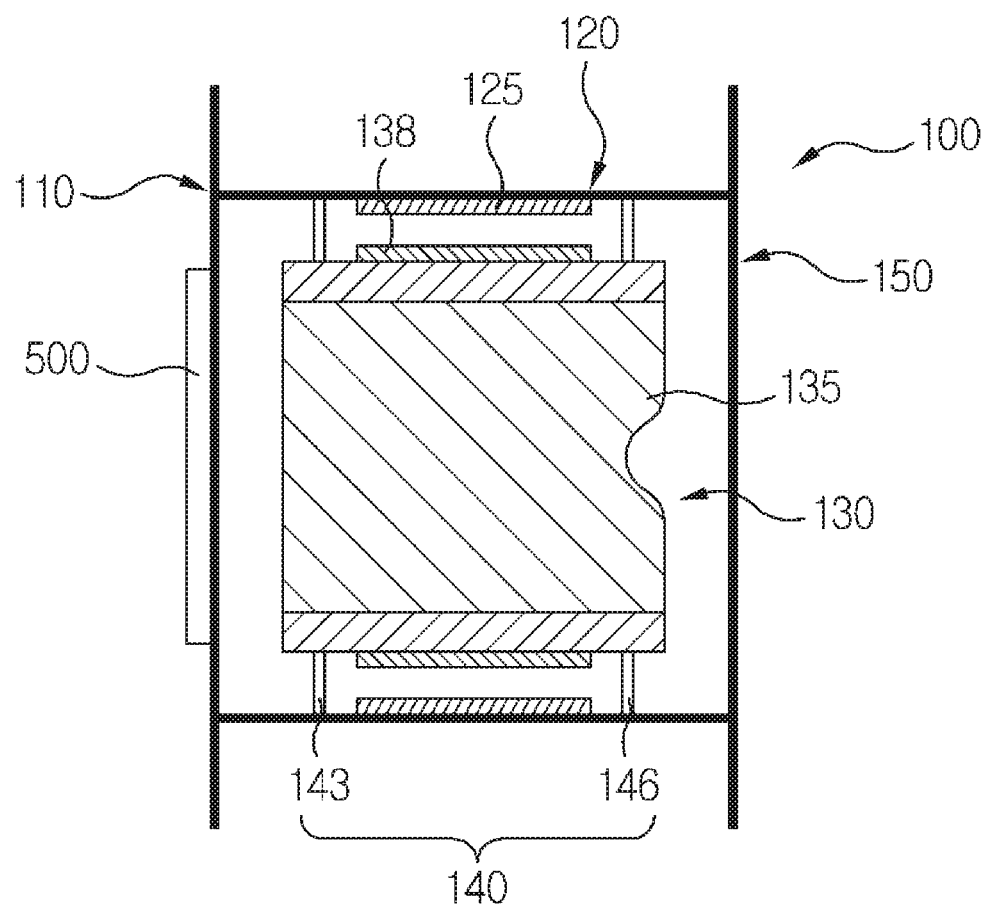
FIG. 3 is a schematic cross-sectional view illustrating a lens of a camera module being positioned at a lateral surface direction according to an exemplary embodiment of the present disclosure.
Figure 4:
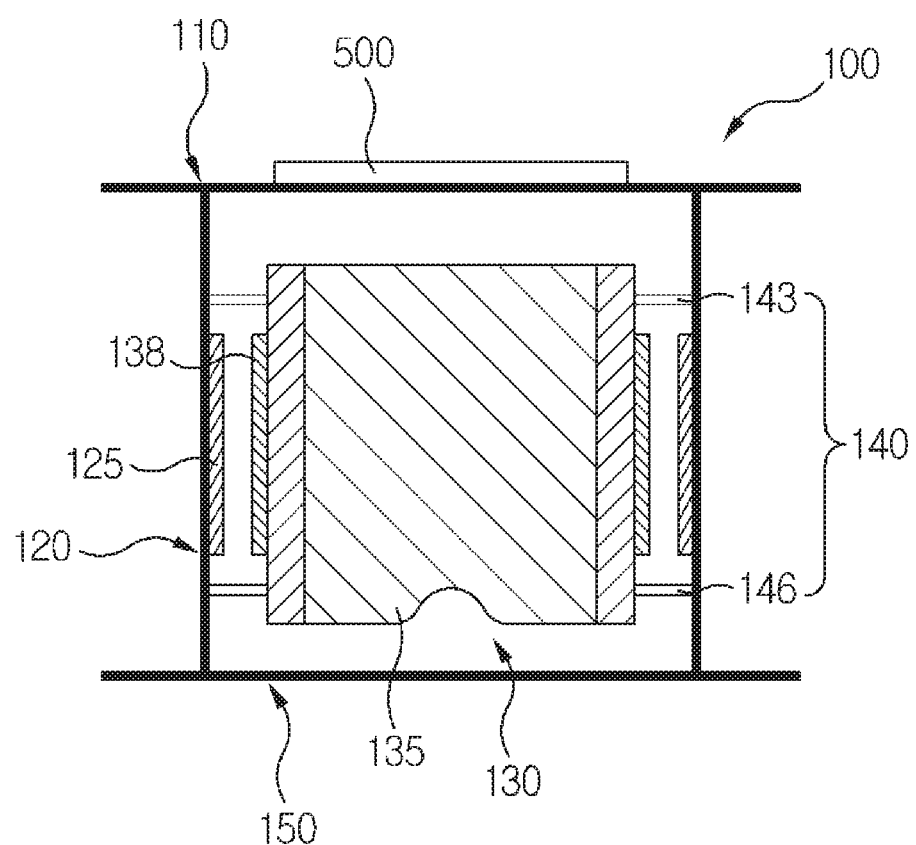
FIG. 4 is a schematic cross-sectional view illustrating a lens of a camera module being positioned at a bottom surface direction according to an exemplary embodiment of the present disclosure.

FIG. 2 is a schematic cross-sectional view illustrating a lens of a camera module being positioned at an upper surface direction according to an exemplary embodiment of the present disclosure, FIG. 3 is a schematic cross-sectional view illustrating a lens of a camera module being positioned at a lateral surface direction according to an exemplary embodiment of the present disclosure, and FIG. 4 is a schematic cross-sectional view illustrating a lens of a camera module being positioned at a bottom surface direction according to an exemplary embodiment of the present disclosure.

As described above, FIG. 2 illustrates an UP POSTURE where a lens of a camera module is positioned at an up direction, and the UP POSTURE may be defined that an optical axis of a lens (135) of a mover (130) of a VCM is formed perpendicular to a ground, and a base (110) is arranged opposite to the ground.

FIG. 3 illustrates an SIDE POSTURE where a lens of a camera module is positioned at a lateral direction, and the SIDE POSTURE may be defined that an optical axis of the lens (135) of the mover (130) of the VCM is formed parallel with the ground, and the base (110) is arranged perpendicular to the ground. FIG. 4 illustrates a DOWN POSTURE where a lens of a camera module is positioned at a down direction, and the DOWN POSTURE may be defined that an optical axis of the lens (135) of the mover (130) of the VCM is formed perpendicular to the ground, and a cover (150) is arranged opposite to the ground.

At this time, a VCM (100) used for the actuator in FIGS. 2, 3 and 4, where the mover (130), a stator (120), the base (110), an elastic member (140) and the cover (150) may be parts of the VCM (100).

Now, referring to FIG. 2, the VCM (100) performs the auto focusing function by driving the mover (130) to a forward direction or to a reverse direction. By way of example, the mover (130) mounted on the VCM (100) is driven to a forward direction ascending to the cover (150), or to a reverse direction descending to the base (110), and the auto focusing operation is performed between the lens (135) and an image sensor (500) in the midst of the ascending or descending operation process. That is, the mover (130) is spaced apart from the cover (150) and the base (110).

Furthermore, the base (110) takes a shape of a plate centrally formed with an opening to pass light, and the base (110) serves to function as a bottom stopper of the mover (130). The image sensor (500) may be arranged at a rear surface or a rear side of the base (110). The image sensor (500) converts the light focused through the lens of the mover (130) to a digital image or a video.

The stator (120 is fixed on the base (110). A first driving unit (138) may be a magnet, and a second driving unit (125) may be a wound coil. Alternatively, the first driving unit (138) may be a wound coil and the second driving unit (125) may be a magnet. The stator (120) may be formed therein with a reception space in which the mover (130) may be positioned. The elastic member (140) is fixed at one side to the mover (130), and fixed at the other side opposite to the one side to the stator (120), whereby the elastic member (140) can elastically support the mover (130).

In the exemplary embodiment of the present disclosure, the elastic member (140) may include a first elastic member (143) formed at a peripheral bottom end of the mover (130), and a second elastic member (146) formed at peripheral upper end of the mover (130). The cover (150) is fixed to the base (110), and the cover (150) wraps the stator (120) and the mover (130). The cover (150) also serves to function as an upper stopper stopping the mover (130).

Thus, the exemplary embodiment of the present disclosure can advantageously solve a defocusing problem by applying a current to an opposite direction even if there is change in a spring because the mover can drive to a bi-direction.

Figure 5:
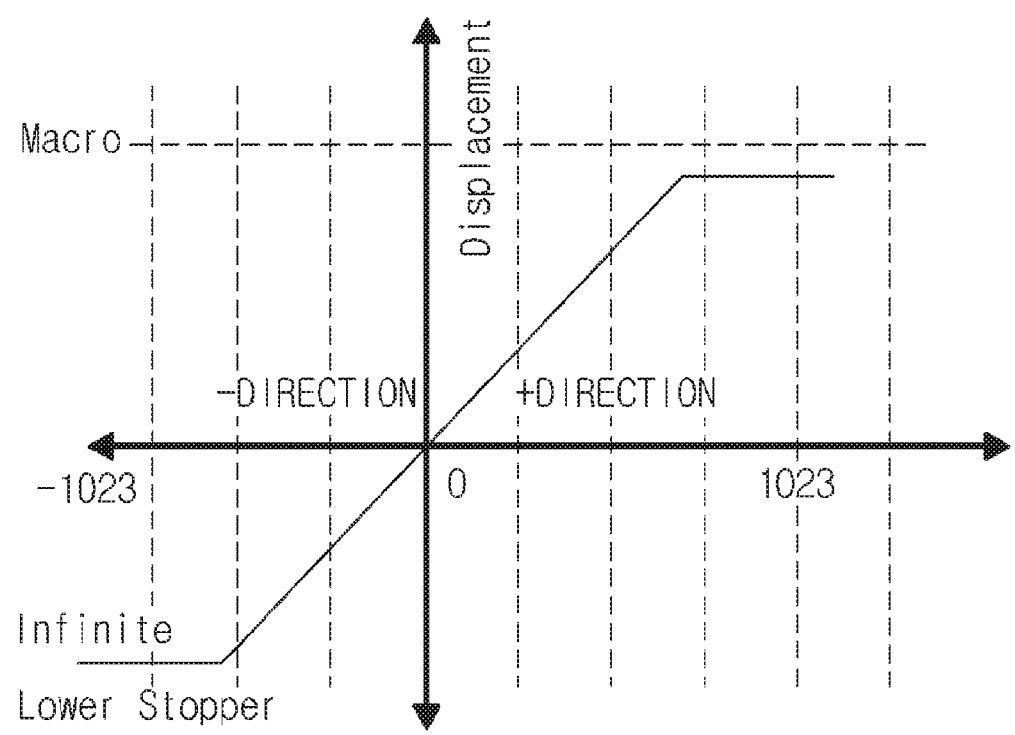
FIG. 5 is a graph illustrating a current-distance characteristic of a camera module according to an exemplary embodiment of the present disclosure.

FIG. 5 is a graph illustrating a current-distance characteristic of a camera module according to an exemplary embodiment of the present disclosure.

As noted above, the camera module according to an exemplary embodiment of the present disclosure can increase a resolving power of the camera module, because the mover can be driven to bi-direction (forward direction or reverse direction), where an LSB for bi-directional driving is allocated to −1023~1023.

That is, the camera module is configured such that an LSB is 0~−1023 that is allocated to drive the first search section where the mover is driven to a reverse direction (−) including a lens, and an LSB is 0~1023 that is allocated to drive the second search section where the mover is driven to a forward direction (+), where the number of bits allocated to a reverse direction may increase or decrease depending on a current value or a reverse stroke. Furthermore, in a case the LSB is 0, a current value may be 0 mA, and in a case the LSB is −1023, a current value may be −50 mA, and in a case the LSB is 1023, a current value may be +50 mA.

Figure 6:
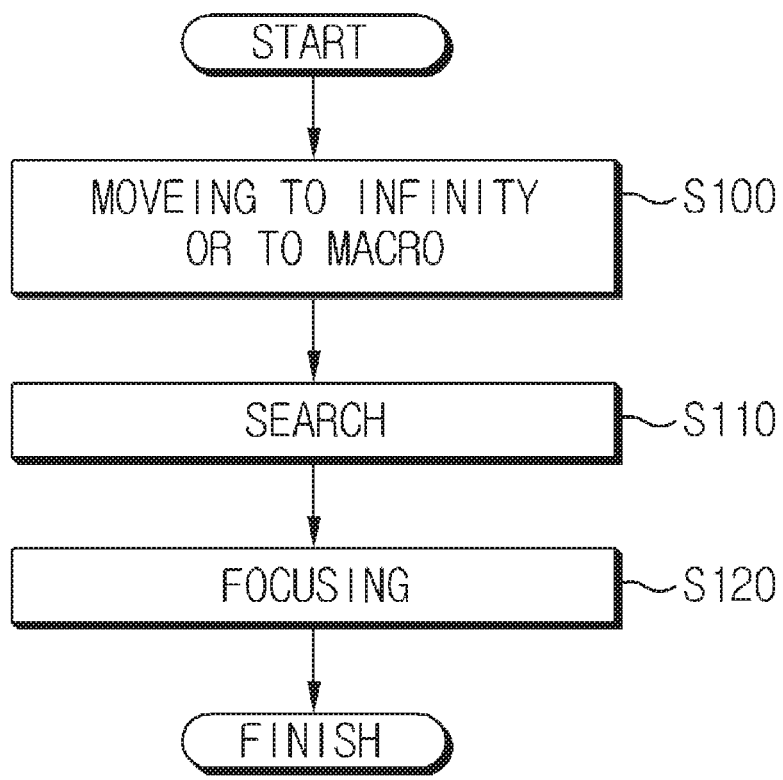
FIG. 6 is a flowchart for illustrating a method for auto focusing a camera module according to an exemplary embodiment of the present disclosure.

FIG. 6 is a flowchart for illustrating a method for auto focusing a camera module according to an exemplary embodiment of the present disclosure.

Referring to FIG. 6, the method for auto focusing a camera module according to a first exemplary embodiment of the present disclosure is moving a mover including a lens to infinity or macro (S100). Next, the mover movement is started at the infinity or the macro to search for a best focusing point (S110). At this time, in a case the mover is moved to the macro in S100, the mover is moved to the macro from the infinity to search for the best focusing point, and in a case the mover is moved to the macro, the mover is moved to the macro from the infinity to search for the best focusing point.

Furthermore, the search for the best focusing point may be implemented by providing an inclination, whereby a mechanical impact sound of the camera module can be reduced. Because the LSB bit allocated to a step searching for the best focusing point is −1023~1023, an LSB allocated to the infinity is −1023, and an LSB allocated to the macro is 1023. Successively, the focusing is implemented to the searched best focusing point.

Furthermore, a method for auto focusing a camera module according to another exemplary embodiment of the present disclosure may include performing a first search by moving the mover including a lens, determining, by the first search, whether an increase in focusing value is an infinity direction, or a macro direction, moving the mover to the infinity to search a best focusing point in a case the focusing value increases to the infinity direction, and performing the focusing to the searched best focusing point.

Furthermore, in the step of determining, by the first search, whether an increase in focusing value is an infinity direction, or a macro direction, and in a case the focusing value increases to the macro direction, the mover may be moved to perform a step of searching for the best focusing point.

Furthermore, the method may include reducing a mechanical impact sound by lengthening a time of moving the mover to the infinity direction or the macro direction in an initial step over that of other steps. Still furthermore, the method may further include reducing a mechanical impact sound by dividing a step size of initially moving the mover to the infinity direction or the macro direction to several stages.

Figure 7:
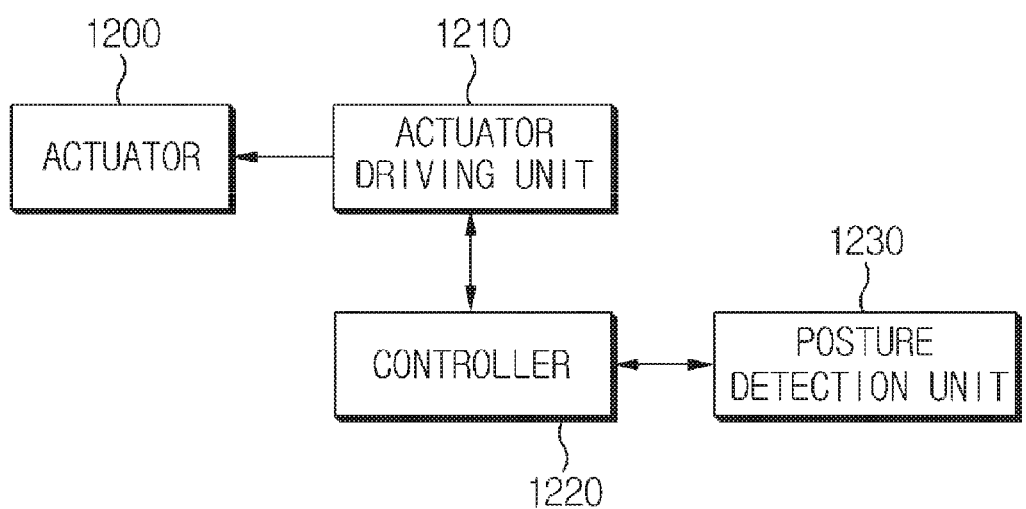
FIG. 7 is a schematic block diagram illustrating a configuration of a camera module according to an exemplary embodiment of the present disclosure.

FIG. 7 is a schematic block diagram illustrating a configuration of a camera module according to an exemplary embodiment of the present disclosure.

The camera module according to an exemplary embodiment of the present disclosure includes an actuator (1200) moving a mover including at least one lens receiving an optical image of an object, and an actuator driving unit (1210) controlling the actuator (1200) to drive the mover to a forward direction or to a reverse direction, where the actuator driving unit (1210) controls the actuator (1200) to drive the mover to the forward direction or to the reverse direction.

In addition, a driving scope of the mover by the actuator driving unit (1210) includes a first search section and a second search section, in a case a search section driving the mover to the forward direction is defined as the first search section, and a search section driving the mover to the reverse direction is defined as the second search section.

At this time, one half may be allocated to drive the first search section and the other half may be allocated to drive the second search section. By way of example, an LSB allocated to drive the first search section and the second search section may be 0~1023. At this time, an LSB allocated to drive the first search section may be 0~513, and an LSB allocated to drive the second search section is 513~1023. Furthermore, the first search section and the second search section are symmetrical or asymmetrical. In addition, an LSB allocated between the first and second search sections may be within a 300~500 LSB scope, and an LSB allocated between the first and second search sections may be within a 500~1000 LSB scope.

Hence, the camera module according to an exemplary embodiment of the present disclosure is advantageous in that an algorithm driving an actuator can be simplified even if there is no information whether to move an actuator to a forward direction or a reverse direction, by adding a direction bit to the forward direction and the reverse direction, and by designating a current value for each address and by allocating a search section in which a mover can be driven to the forward direction and the reverse direction in a 0~1023 LSB.

Referring to FIG. 7 again, a camera module according to an exemplary embodiment of the present disclosure may further include a posture detection unit (1230) outputting a posture data by detecting a posture of the mover, and a controller (1220) receiving the posture data outputted by the posture detection unit (1230) and outputting a control signal to the actuator driving unit (1210).

That is, the posture detection unit (1230) outputs the posture data by detecting a posture of the mover, the controller (1220) receives the posture data outputted by the posture detection unit (1230) and outputs a control signal corresponding to the posture of the mover to the actuator driving unit (1210), and the actuator driving unit (1210) appropriately drives the actuator (1200) in response to the posture of the mover. At this time, the posture of the mover may be one of an 'UP' posture of the lens, a 'SIDE' posture of the lens and a 'DOWN' posture of the lens, as described later.

Although the posture detection unit (1230) may sense more than the three kinds of postures, description will be made on sensing by the posture detection unit (1230) of the three postures of UP, SIDE and DOWN postures for convenience sake in the exemplary embodiment of the present disclosure.

The actuator (1200) may be one of a VCM (Voice Coil Motor) actuator, an actuator driven by piezoelectric power, and a MEMS (Micro Electro Mechanical System) actuator driven by electrostatic capacity method. By way of example, the VCM performs an auto focusing of the camera module by driving the mover in response to an electromagnetic force. Furthermore, the posture detection unit (1230) may include a gyro sensor configured to detect a gravitational direction.

Figure 8:
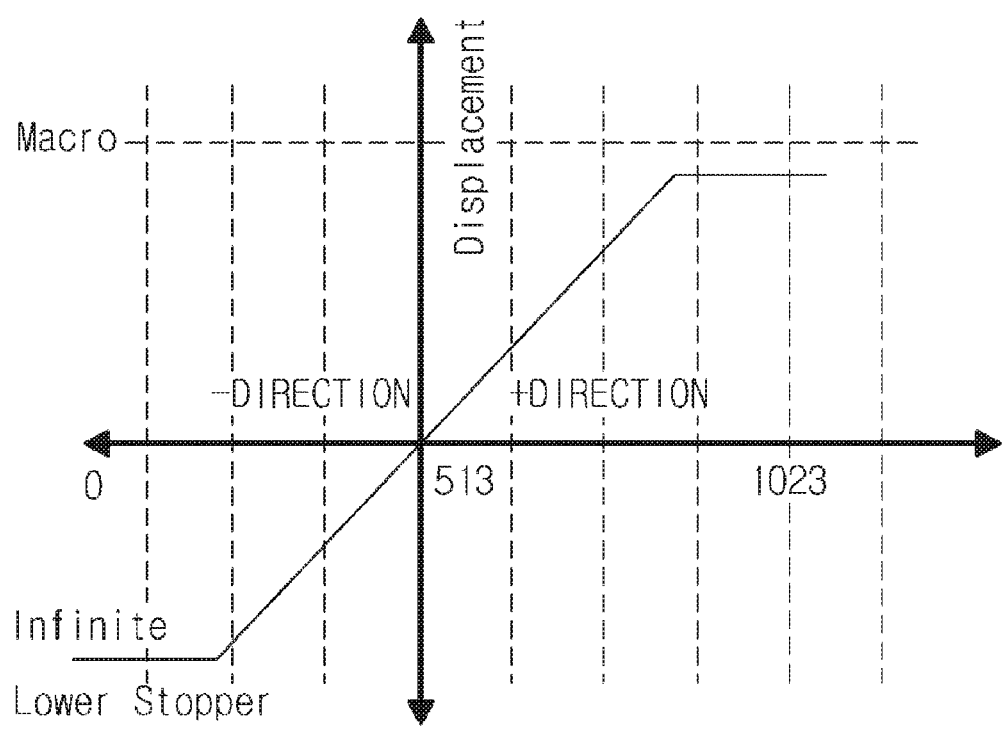
FIG. 8 is a graph illustrating a current-distance characteristic of a camera module according to an exemplary embodiment of the present disclosure.

FIG. 8 is a graph illustrating a current-distance characteristic of a camera module according to an exemplary embodiment of the present disclosure.

The camera module according to an exemplary embodiment of the present disclosure is configured such that an LSB bit is 0~513 that is allocated to drive the first search section where the mover is driven to a reverse direction (−) including a lens, and an LSB bit is 513~1023 that is allocated to drive the second search section where the mover is driven to a forward direction (+), where the number of bits allocated to a reverse direction may increase or decrease depending on a current value or a reverse stroke.

Furthermore, in a case the LSB is 0, a current value may be −50 mA, and in a case the LSB is 513, a current value may be 0 mA, and in a case the LSB is 1023, a current value may be +50 mA.

Figure 9:
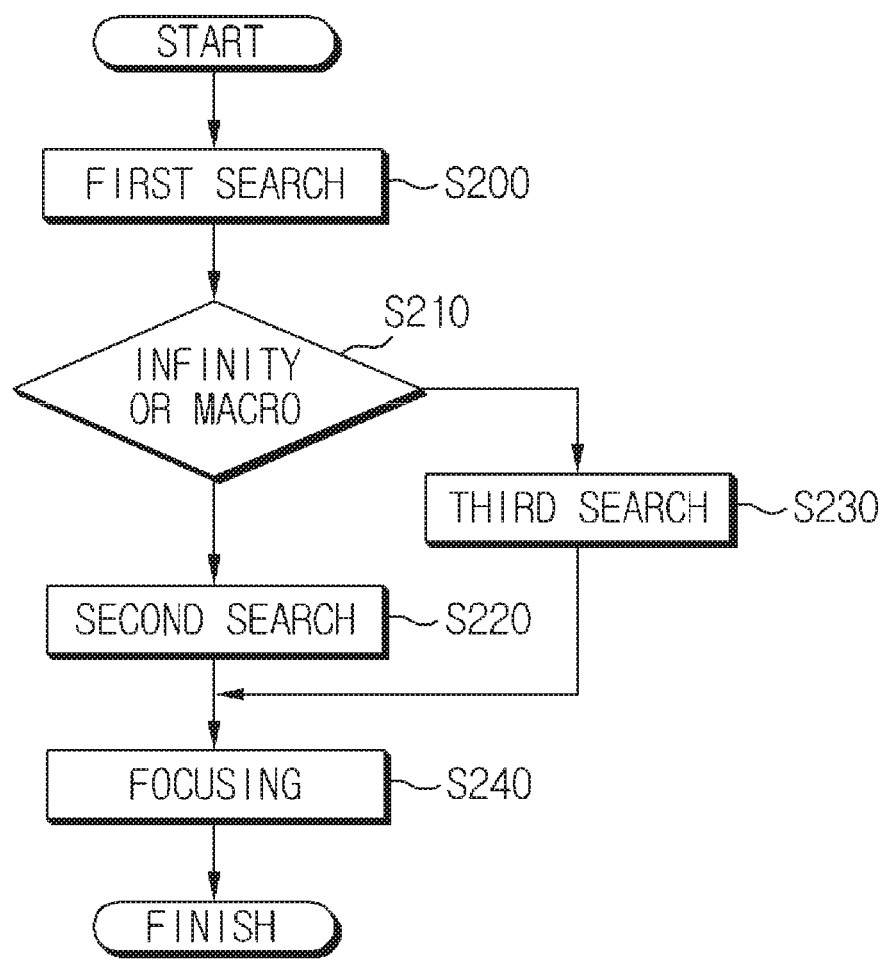
FIG. 9 is a flowchart for illustrating a method for auto focusing a camera module according to an exemplary embodiment of the present disclosure.

FIG. 9 is a flowchart for illustrating a method for auto focusing a camera module according to an exemplary embodiment of the present disclosure.

Referring to FIG. 9, the method for auto focusing a camera module includes performing a first search by moving a mover including a lens (S200). Successively, a determination is made as to whether an increase of focusing value is an infinity direction or a macro direction using the first search (S210). The mover is then moved to the infinity to search a best focusing point, if it is determined that the focusing value increases to the infinity direction (S220), where, in a case the focusing value increases to the macro direction in the step (S210) of determining whether an increase of focusing value is the infinity direction or the macro direction using the first search, the best focusing point is searched by moving the mover to the macro (S230).

Thereafter, the focusing is performed to the searched best focusing point, where the method may include reducing a mechanical impact sound by lengthening a time of moving the mover to the infinity direction or the macro direction in an initial step over that of other steps, and may further include reducing a mechanical impact sound by dividing a step size of initially moving the mover to the infinity direction or the macro direction to several stages.

The previous description of the present disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to limit the examples described herein, but is to be accorded the widest scope consistent with the principles and novel features disclosed herein.

INDUSTRIAL APPLICABILITY

The exemplary embodiments of the present disclosure has an industrial applicability in that an algorithm driving an actuator can be simplified, resolution can be increased, a consumed current can be reduced and a defocusing problem can be solved.

What is claimed is:
1. A camera module, the camera module comprising:
a stator;
a mover disposed in the stator and including at least one lens;
a cover surrounding the stator and the mover;
a base fixed to the stator;
an elastic member elastically supporting the mover;
an actuator including a first driving unit formed at the mover and a second driving unit formed at the stator for driving the mover using an electromagnetic interaction with the first driving unit;
an actuator driving unit controlling the actuator to move the mover to a forward direction or to a backward direction opposite to the forward direction; and
a direction bit allocated in the actuator driving unit, wherein the mover is distanced from the cover by a first gap and from the base by a second gap at an initial position when no current is applied to the actuator; and
wherein the direction bit comprises a datum defined as the forward direction or the backward direction, and control data comprises a control bit added to the direction bit, such that the mover is driven to the forward direction with decreasing the first gap or to the backward direction with decreasing the second gap through the direction bit according to the control data.

2. The camera module of claim 1, wherein a search section driving the mover to the backward direction is defined as a first search section, and the search section driving the mover to the forward direction is defined as a second search section; and wherein the first search section or the second search section is determined through the direction bit.

3. The camera module of claim 2, wherein the direction bit comprises a forward direction bit and a backward direction bit, wherein the forward direction bit is allocated to drive the first search section and the backward direction bit is allocated to drive the second search section, and wherein a size of the first search section is the same as that of the second search section.

4. The camera module of claim 3, wherein the forward direction bit or the backward direction bit is a separate direction bit added to the actuator driving unit.

5. The camera module of claim 2, wherein the first search section and the second search section are symmetrical or asymmetrical.

6. The camera module of claim 3, wherein a size of the first search section is the same as that of the second search section.

7. The camera module of claim 1, further comprising: a posture detection unit outputting a posture data by detecting a posture of the mover, and a controller receiving the posture data outputted by the posture detection unit and outputting a control signal to the actuator driving unit.

8. The camera module of claim 7, wherein the posture of the mover is one of an 'UP' posture of the lens, a 'SIDE' posture of the lens and a 'DOWN' posture of the lens.

9. The camera module of claim 1, wherein the elastic member comprises a first elastic member fixed at one side to the mover and a second elastic member fixed at the other side opposite to the one side to the stator, to elastically support the mover.

10. The camera module of claim 1, wherein the actuator comprises a bottom stopper fixed at the stator to stop the mover, and an upper stopper stopping the mover.

11. The camera module of claim 5, wherein one half of a size of the symmetrical search section is allocated to drive the first search section and the other half is allocated to drive the second search section.

12. The camera module of claim 2, wherein the size of the first and second search sections is 512 or 1024 least significant bits.

13. A method for auto focusing a camera module, the camera module comprising a stator, a mover disposed in the stator and including at least one lens, a cover surrounding the stator and the mover; a base fixed by the stator; and an elastic member elastically supporting the mover, wherein the method comprises:
providing the mover gap at an initial position where the mover is distanced from the cover by a first gap and from the base by a second gap when no current is applied thereto;
moving the mover including the at least one lens over a search section;
determining whether an increase of a focusing value is an infinity direction or a macro direction;

moving the mover to a position of the infinity or the macro to search a best focusing point when the focusing value increases to the infinity direction or to the macro direction, respectively, by using a direction bit, wherein the direction bit comprises a datum defined as a forward direction or a backward direction, and control data comprises a control bit added to the direction bit, such that the mover is driven to the forward direction with decreasing the first gap and to the backward direction with decreasing the second gap through the direction bit according to the control data; and performing the focusing to the searched best focusing point.

14. The method of claim 13, further comprising reducing a mechanical impact sound by lengthening a time of moving the mover to the infinity direction or the macro direction in an initial step over that of other steps.

15. The method of claim 13, further comprising reducing a mechanical impact sound by dividing a step size of initially moving the mover to the infinity direction or the macro direction to several stages.

16. The method of claim 13, wherein the direction bit comprises a forward direction bit and a backward direction bit allocated to move the mover over the search section.

17. The method of claim 16, wherein the search section comprises a first search section over which the mover moves in the forward direction through the forward direction bit and a second search section over which the mover moves in the backward direction through the backward direction bit.

18. The method of claim 13, wherein the first search section and the second search section are symmetrical or asymmetrical.

19. The method of claim 13, wherein a size of the first search section is the same as that of the second search section.

20. The method of claim 13, wherein the size of the first and second search sections is 512 or 1024 least significant bits.

* * * * *